(12) United States Patent
Son (10) Patent No.: US 12,314,800 B2
(45) Date of Patent: May 27, 2025

(54) TAG READER DEVICE FOR AMUSEMENT FACILITY AND PLAYING EQUIPMENT HAVING THE SAME

(71) Applicant: TENCL, Seoul (KR)

(72) Inventor: Joo Hee Son, Seoul (KR)

(73) Assignee: TENCL, Seoul (KR)

( * ) Notice: Subject to any disclaimer, the term of this patent is extended or adjusted under 35 U.S.C. 154(b) by 174 days.

(21) Appl. No.: 17/921,427

(22) PCT Filed: Mar. 29, 2021

(86) PCT No.: PCT/KR2021/003867
§ 371 (c)(1),
(2) Date: Oct. 26, 2022

(87) PCT Pub. No.: WO2021/221321
PCT Pub. Date: Nov. 4, 2021

(65) Prior Publication Data
US 2023/0161981 A1 May 25, 2023

(30) Foreign Application Priority Data
Apr. 28, 2020 (KR) .................. 10-2020-0051323

(51) Int. Cl.
*G06K 7/10* (2006.01)
(52) U.S. Cl.
CPC .............. *G06K 7/10316* (2013.01)
(58) Field of Classification Search
CPC .................................. G06K 7/10316
USPC ............................................. 235/451
See application file for complete search history.

(56) References Cited

U.S. PATENT DOCUMENTS

| 2009/0167699 | A1* | 7/2009 | Rosenblatt | H01Q 7/00 345/173 |
|---|---|---|---|---|
| 2011/0232849 | A1* | 9/2011 | Bahou | G06Q 10/08 160/2 |

FOREIGN PATENT DOCUMENTS

| JP | 2006-122439 A | 5/2006 |
|---|---|---|
| KR | 10-2004-0084419 A | 10/2004 |
| KR | 10-2007-0032498 A | 3/2007 |
| KR | 10-1490293 B1 | 2/2015 |
| KR | 10-2018-0084295 A | 7/2018 |
| KR | 10-1961716 B1 | 3/2019 |
| KR | 10-2189896 B1 | 12/2020 |

OTHER PUBLICATIONS

International Search Report for PCT/KR2021/003867 mailed on Jul. 9, 2021.

* cited by examiner

*Primary Examiner* — Daniel A Hess
(74) *Attorney, Agent, or Firm* — The PL Law Group, PLLC (57) ABSTRACT

A tag reader device for an amusement facility may be positioned on a display module for displaying an image and the display module. The tag reader device includes an antenna substrate on which a radio frequency identification antenna is formed, a protective plate disposed on the antenna substrate, and a storage container for accommodating the display module and the antenna substrate.

11 Claims, 9 Drawing Sheets

TAG READER DEVICE FOR AMUSEMENT FACILITY AND PLAYING EQUIPMENT HAVING THE SAME

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/003867, filed Mar. 29, 2021, which claims priority to the benefit of Korean Patent Application No. 10-2020-0051323 filed in the Korean Intellectual Property Office on Apr. 28, 2020, the entire contents of which are incorporated herein by reference.

BACKGROUND

1. Technical Field

The present invention relates to a tag reader device for an amusement facility, and more particularly, to a tag reader device installed in an amusement facility and operated by proximity of a tag possessed by a user.

2. Background Art

Kids café is an amusement facility for children. When mothers or parents with young children or guardians who are temporarily taking care of children have an unavoidable appointment, they bring the children under their care to the meeting place and meet with adults. On the other hand, it refers to a place equipped with indoor amusement facilities so that children can play freely within the sight of their guardians as children.

In such an amusement facility, standardized prefabricated slide frame by injection or extrusion molding or slides and ladder structures using cylindrical structures are installed. However, the structures are installed in an independent state, and there is no organic connection, and thus the interest of children who are users has not been raised.

SUMMARY

Accordingly, the technical problem of the present invention has been conceived in this respect, and an object of the present invention is to provide a play equipment to increase children's interest in an amusement facility, and to satisfy not only play, but also exercise and educational aspects, applying a radio frequency identification (RFID) tag and a tag reader device that can recognize them to an amusement facility, and in this case, to provide tag reader device for an amusement facility with improved user convenience and high reliability.

Another object of the present invention is to provide a play equipment including the tag reader device.

According to an exemplary embodiment of the inventive concept, a tag reader device for an amusement facility includes a display module for displaying images, an antenna substrate disposed on the display module with overlapping the display module, and having a RFID (radio frequency identification) antenna for recognizing proximity of a RFID tag, a protective plate disposed on the antenna substrate, and a storage container for accommodating the display module and the antenna substrate.

In an embodiment of the present invention, a plurality for openings arranged in a matrix form may be formed on the antenna substrate.

In an embodiment of the present invention, in the display module, a plurality of light emitting diodes (LEDs) may be arranged in an array form, and an image may be displayed according to lighting of the LED, the LEDs may be disposed corresponding to the openings of the antenna substrate.

In an embodiment of the present invention, the RFID antenna of the antenna substrate may be a loop-type antenna and may be disposed so as not to overlap the openings.

In an embodiment of the present invention, the antenna substrate may be a transparent substrate.

In an embodiment of the present invention, the tag reader device may further include an internal support frame including an antenna substrate support unit on which the antenna substrate is mounted and a seating unit on which the display module is mounted. The internal support frame may be disposed in the storage container.

In an embodiment of the present invention, the tag reader device may further include a battery that supplies power to the display module and may be disposed in the storage container.

In an embodiment of the present invention, the tag reader device may further include a spacer to form a predetermined distance between the antenna substrate and the display module.

In an embodiment of the present invention, the spacer may be positioned between the antenna support unit and the antenna substrate and may be formed of an elastic material.

In an embodiment of the present invention, the spacer may be a transparent plate disposed between the display module and the antenna substrate.

In an embodiment of the present invention, the storage container may include an upper storage container and a lower storage container. A front opening area exposing the protective plate may be formed in the upper storage container, and the image may be displayed through the front opening area. A coupling portion formed by bending a portion of a bottom surface of the lower storage container may be formed in the lower storage container.

In an embodiment of the present invention, the tag reader device may further include a circuit board for generating tag input information by using a tag signal input through the RFID antenna. The circuit board may include a communication unit for wirelessly transmitting the tag input information to an external device.

In an embodiment of the present invention, the circuit board may further include a control unit to determine an image displayed on the display module according to the tag signal input through the RFID antenna.

According to an exemplary embodiment of the inventive concept, a play equipment includes a cylindrical pipe, a buffer unit surrounding the pipe and exposing a portion of the pipe, a tag reader device positioned on the portion of the pipe which is exposed, and including a coupling portion, a U-shaped coupling ring coupled to the coupling portion and surrounding the portion of the pipe, and a cut-out buffer unit formed a cut-out section to expose the tag reader device, which surrounds the coupling ring and the portion of the pipe. The tag reader device includes a display module for displaying an image, an antenna substrate disposed on the display module to overlap the display module and having a RFID antenna for recognizing proximity of a RFID tag, a protective plate disposed on the antenna substrate, and a storage container for accommodating the display module and the antenna substrate.

According to the exemplary embodiments of the present invention, a tag reader device for an amusement facility is disposed on a display module for displaying an image and the display module and includes an antenna substrate on which a radio frequency identification (RFID) antenna is formed, a protective plate disposed on the antenna substrate, and a storage container for accommodating the display module and the antenna substrate.

The tag reader device generates tag input information by using a tag signal input through the RFID antenna, so that tags of a plurality users can be recognized through one tag reader device.

In addition, the tag reader device can implement a structure that is easy to maintain, is simple to manufacture, is resistant to external impacts, has an improved RFID tag recognition rate, and an image is displayed on the front through a structure in which a display module, an antenna substrate, and a protective plate are sequentially stacked.

In addition, since a plurality of tag reader devices are installed in various places in the amusement facility, whether to tag each tag reader device of multiple users may be identified, and the communication unit can collect data on this, it is possible to establish a system for various play and educational purposes.

However, the effects of the present invention are not limited to the above effects and may be variously expanded without departing from the spirit and scope of the present invention.

DETAILED DESCRIPTION

Hereinafter, exemplary embodiments of the present invention will be described in more detail with reference to the drawings.

Since the present invention may have various changes and have various forms, specific exemplary embodiments are illustrated in the drawings and described in detail in the text. However, it is not intended to limit the present invention to the specific disclosed form, and it will be appreciated that the present invention includes all modifications, equivalences, or substitutions included in the spirit and the technical scope of the present invention.

Figure 1:
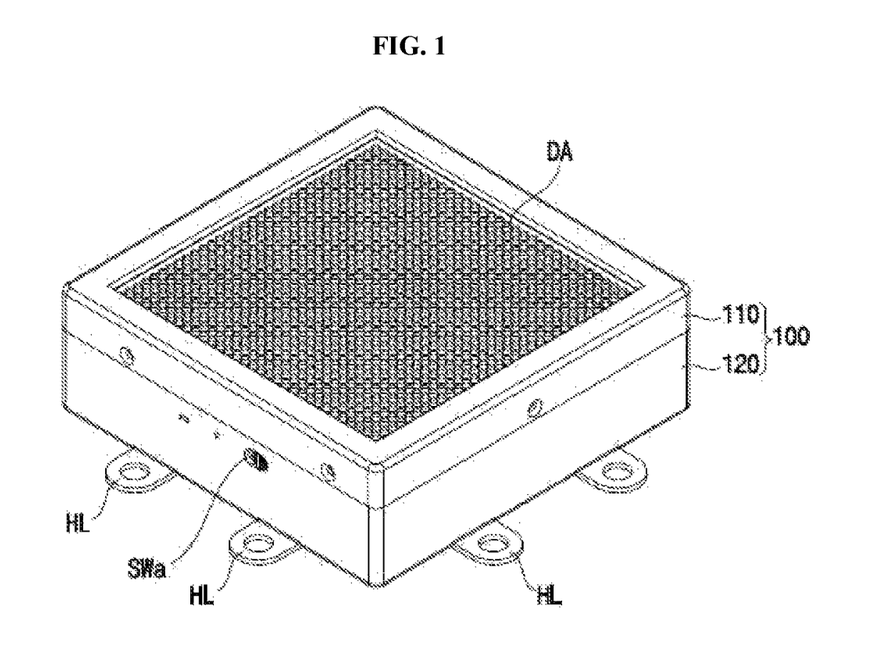
FIG. 1 is a perspective view of a tag reader device for an amusement facility according to an exemplary embodiment of the present invention.
Figure 2:
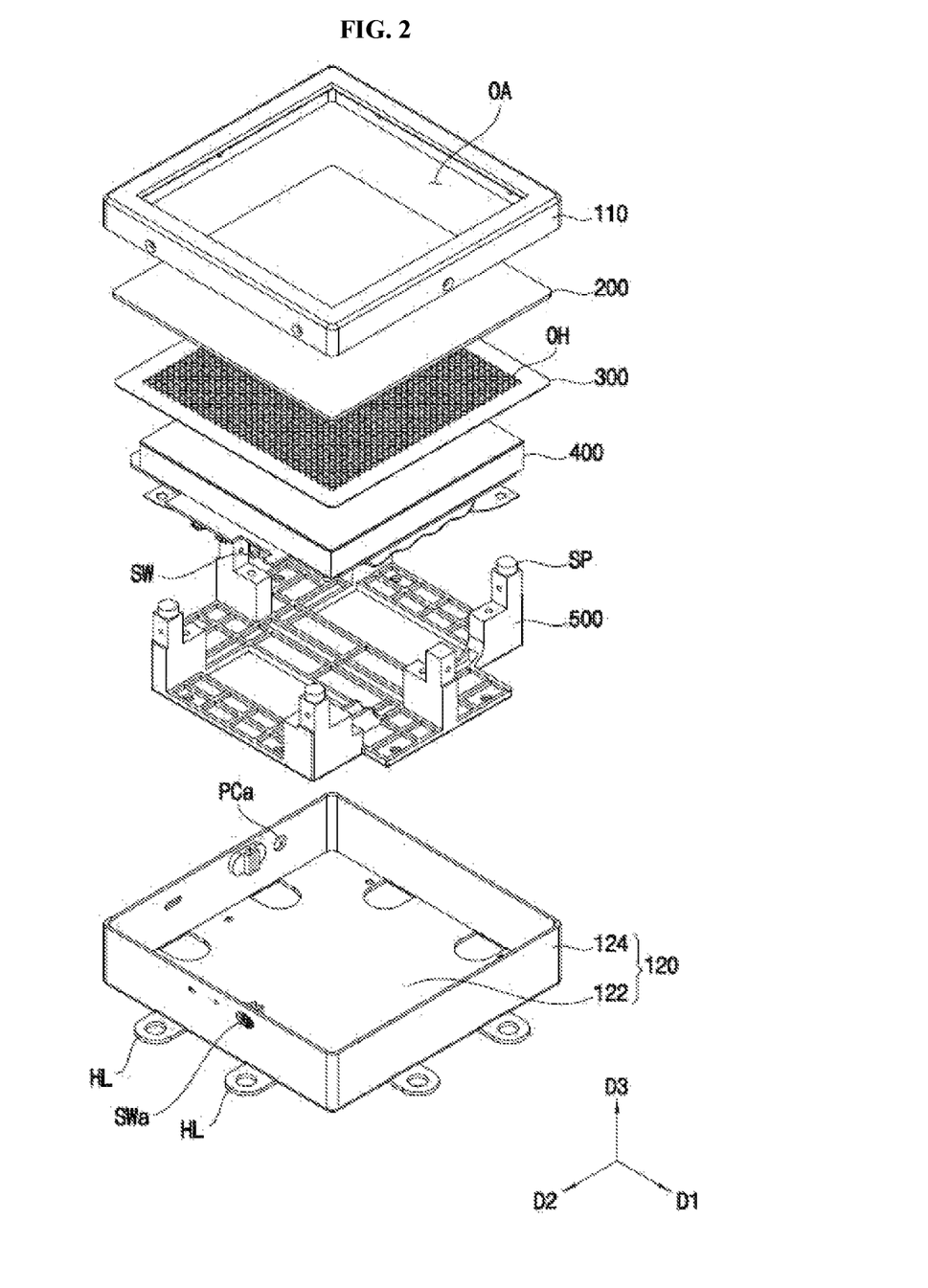
FIG. 2 is an exploded perspective view of the tag reader device of FIG. 1.
Figure 3A:
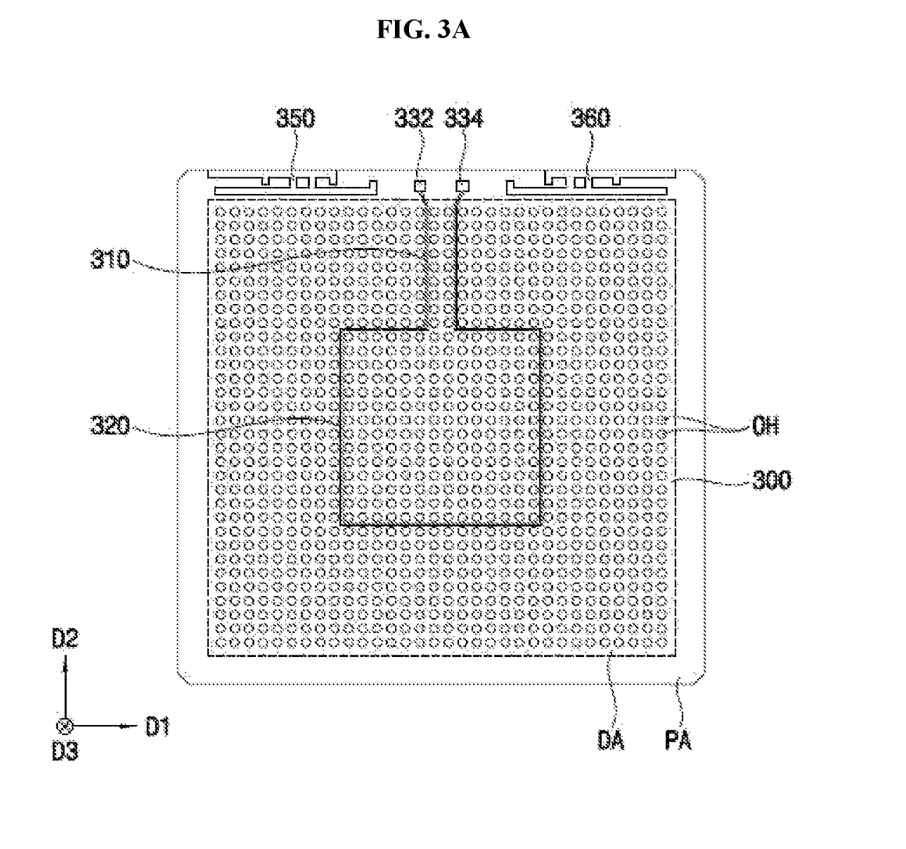
FIG. 3A and FIG. 3B are a bottom view and a side section view of the tag reader device of FIG. 1.
Figure 3B:
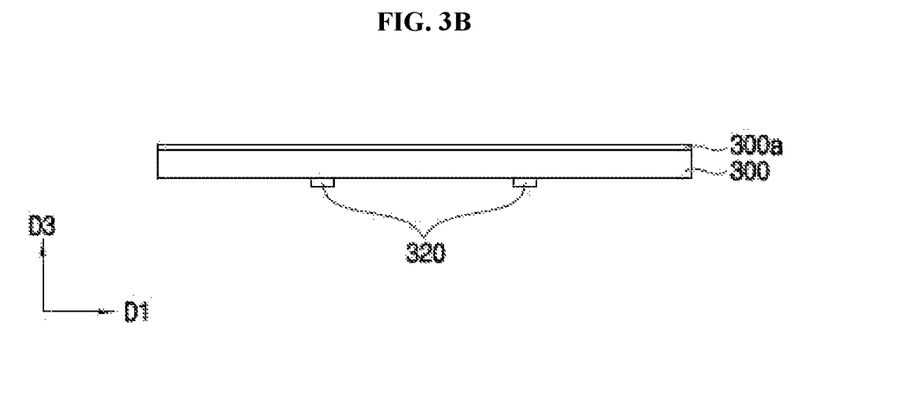
Figure 4:
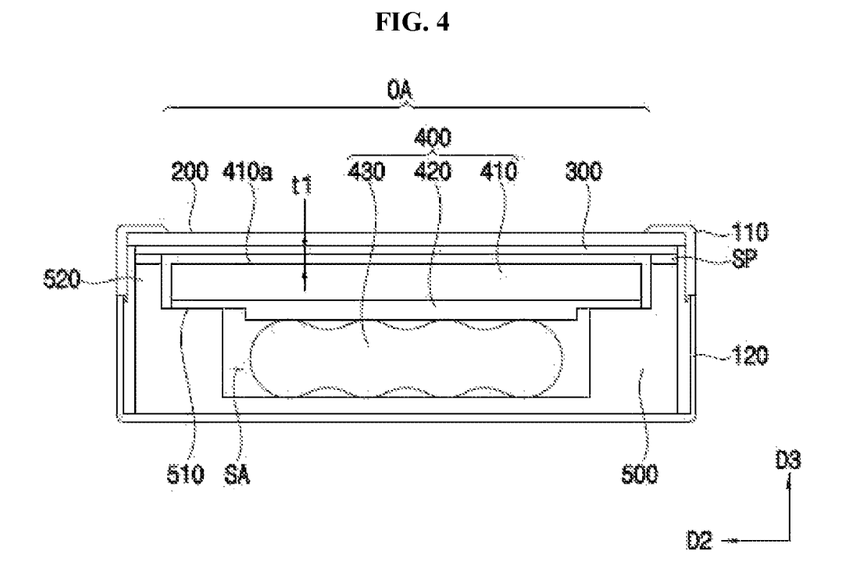
FIG. 4 is a side section view of the tag reader device of FIG. 1.

FIG. 1 is a perspective view of a tag reader device for an amusement facility according to an exemplary embodiment of the present invention. FIG. 2 is an exploded perspective view of the tag reader device of FIG. 1. FIG. 3A and FIG. 3B are a bottom view and a side section view of the tag reader device of FIG. 1. FIG. 4 is a side section view of the tag reader device of FIG. 1.

Referring to FIG. 1 to FIG. 4, the tag reader device may include a storage container 100, a protective plate 200, an antenna substrate 300, a display module 400, and an internal support frame 500.

The storage container 100 may conclude an upper storage container 110 and a lower storage container 120. The upper storage container 110 and a lower storage container 120 in conjunction with each other may accommodate the protective plate 200, the antenna substrate 300, the display module 400, and the internal support frame 500.

A front opening area OA may be formed in the upper storage container 110 to display an image through the display module 100. A display area DA in which an image is displayed through the display module 400 may be defined by the front opening area OA. A peripheral area PA surrounding the display area DA may be covered by the upper storage container 110.

A coupling unit HL may be formed in the lower storage container 120. The coupling unit HL may be formed to protrude to the outside of the storage container 100, and an opening for coupling a bolt, etc. may be formed in the coupling unit HL and may be used to bond the tag reader device to the wall surface or the pipe support. (See FIG. 8 and FIG. 9) For example, the coupling unit HL may be formed by bending a portion of the bottom surface of the lower storage container 120.

A switch handle SWa for functions such as mode switching and power on/off may be coupled to the lower storage container 120. The switch handle SWa may be combined with the switch SW formed on the circuit board 420 of the display module 400, so that a user may externally operate on-off of the switch SW.

In addition, a structure may be additionally formed in the lower storage container 120 for a power line opening PCa for connecting an external power source to an external power connection unit of the circuit board 420, a data cable connector for data communication with the circuit board 420, a reset switch, etc.

The protective plate 200 may be exposed through the front opening area OA of the upper storage container 110 to be disposed under the upper storage container 110.

The protective plate 200 may be disposed between the antenna substrate 300 and the upper storage container 110, for the protective plate 200 to prevent damage to the antenna substrate 300 and the display module 400, through the front opening area OA of the display, that is, the upper storage container 110

The protective plate 200 may be formed of a material strong from external impact and may be formed of a transparent material. For example, the protective plate 200 may be a plastic plate made of an acrylic material.

The antenna substrate 300 may be disposed between the protective plate 200 and the display module 400. A radio frequency identification antenna may be formed on the antenna substrate 300.

A plurality of openings OH arranged in a matrix form may be formed in the antenna substrate 300. The RFID antenna is a loop antenna and is disposed so as not to overlap the openings. The RFID antenna may include connection terminals 332 and 334, a connection unit 310 connected to the connection terminals 332 and 334, and a loop-type unit 320 connected to the connection unit 310. The RFID antenna may be electrically connected to the circuit board 420 through the connection terminals 332 and 334.

For example, the antenna substrate 300 may be a PCB substrate on which the RFID antenna is printed on a surface, and for a beautiful appearance, a color layer 300a having an appropriate color may be formed on the upper surface visible to the user. For example, the RFID antenna may be formed on the lower surface of the PCB substrate, and the color layer 300a may be coated on the upper surface, so that the user cannot see the pattern of the RFID antenna, and only an image displayed by the display module 400 may be visually recognized through the openings OH of the antenna substrate 300.

In addition, communication antennas 350 and 360 for communication with an external device may be further formed on the antenna substrate 300. For example, the communication antennas 350 and 360 for communication may be antennas for Bluetooth or Wi-Fi communication. The communication antennas 350 and 360 may be disposed in the peripheral area PA.

Meanwhile, according to another embodiment, the RFID antenna pattern may be formed on the upper surface of the antenna substrate 300. In this case, the color layer 300a may be formed on the RFID antenna pattern to cover the RFID antenna pattern.

The display module 400 may include a display panel 410, the circuit board 420, and an internal power supply unit 430. The display module 400 may be disposed under the antenna substrate 300.

The display panel 410 may display an image. For example, in the display panel 410, a plurality of LEDs may be arranged in an array form, and a desired image may be displayed according to the lighting of the LEDs, and the LEDs may have a structure in which the LEDs are disposed corresponding to the openings OH of the antenna substrate 300. According to another embodiment, the display panel 410 may be an LCD display device, an OLED display device, or the like.

The circuit board 420 may be disposed under the display panel 410. The switch SW may be formed on the circuit board 420 for functions such as mode switching and power on/off. In addition, an operation status LED, a reset switch, a data cable connection terminal, etc. may be further formed on the circuit board 420 to indicate an operation state.

The circuit board 420 may include a display driving unit for driving the display panel 410, a control unit for controlling the operation of the tag reader device, and a communication unit for communicating with an external device. The control unit may generate tag input information using a tag signal input through the RFID antenna, determine an image displayed on the display module 410, or provide it to the communication unit to transmit the tag input information to an external device.

The internal power supply unit 430 may be a battery that supplies power required for the display module 400 and is disposed in the storage container. In addition, an external power connection unit is formed on the circuit board 300, and the external power connection unit may be exposed through the power line opening PCa and may be connected to an external power supply through an external power line (not shown).

The internal support frame 500 may support the display module 400 and the antenna substrate 300 to be disposed in the storage container 100. The internal support frame 500 may include an antenna substrate 510 on which the antenna substrate 300 is mounted and a seating unit 520 on which the display module 400 is mounted. The internal support frame 500 may form a space SA therein, and the internal power supply unit 430 may be disposed therein.

A spacer SP may be disposed between the antenna substrate support 510 of the internal support frame 500 and the antenna substrate 300. The spacer SP may form a predetermined separation distance t1 between the antenna substrate 300 and the display module 400. That is, the antenna substrate 300 may be spaced apart by the separation distance t1 from the upper surface 410a, and this is to minimize the influence of the electromagnetic field formed by the RFID antenna of the antenna substrate 300 by the display module 400, accordingly, the recognition rate of the RFID antenna may be improved. The spacer SP may be formed of an elastic material to minimize transmission of an external impact to the display module 400 and the like.

Also, the spacer SP may be disposed to correspond to the peripheral area PA so as not to cover the display area DA on which an image is displayed.

Meanwhile, according to another embodiment, although the spacer SP is illustrated as being formed as a separate member, it may be formed integrally with the internal support frame 500.

According to the exemplary embodiments of the present invention, since the tag reader device generates tag input information using a tag signal input through a RFID antenna, tags of a plurality of users may be recognized through one tag reader device.

In addition, the tag reader device may implement a structure that is easy to maintain, is simple to manufacture, is resistant to external impacts, has an improved RFID tag recognition rate, and display an image on the front through the structure in which the display module, the antenna substrate, and the protective plate are sequentially stacked.

Meanwhile, the tag reader device according to an embodiment of the present invention may be designed to identify whether multiple users have tagged each tag reader device, provide a notification to the user who has performed the tagging, and display schedule information for various play and educational purposes. In this case, in order to display information only to the user who have actually performed the tagging while exposure to other adjacent users is limited, it is necessary to limit the wide viewing angle to a certain range.

Accordingly, the tag reader device may further include a polarizing film (not shown).

For example, the polarizing film (not shown) may be attached to the protective plate to control a viewing angle of light exposed to the display area DA through the plurality of openings OH of the antenna substrate 300. For example, the polarizing film (not shown) may be attached to the inner surface of the protective plate facing the antenna substrate 300. However, the present invention is not limited thereto, the polarizing film (not shown) may be attached to the outer surface of the protective plate but is preferably attached to the inner surface in order to protect the polarizing film from external impact.

Also, to the same effect, the direction of light exposed to the display area DA may be controlled by controlling the penetration direction of the plurality of openings OH of the antenna substrate 300. For example, in the case of a tag reader device installed at the top of a specific amusement facility, the penetrating direction of the plurality of openings OH may be designed to be inclined downward so that a tagging user located at the bottom may recognize whether or not the tag is being tagged.

Figure 5:
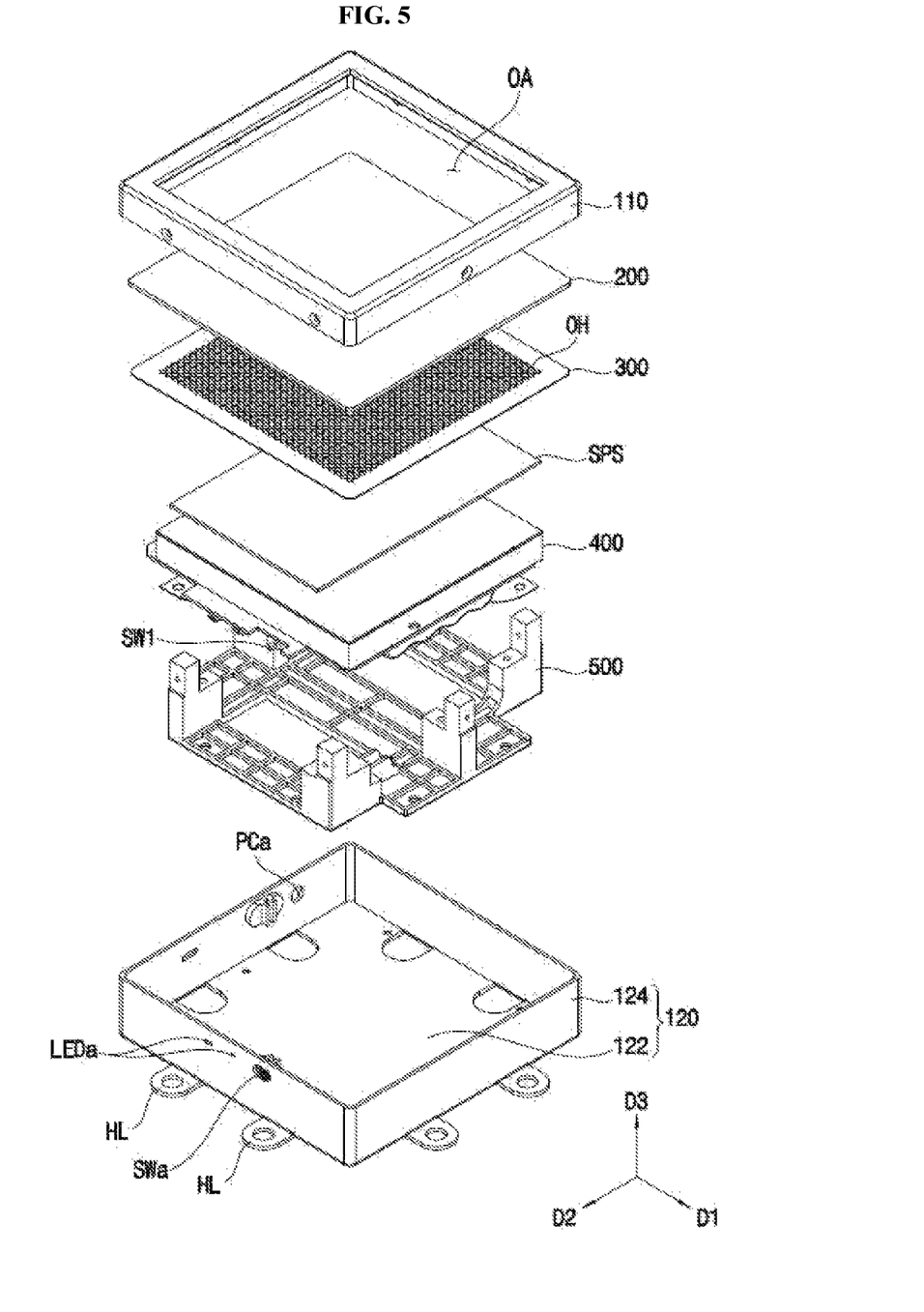
FIG. 5 is a perspective view of a tag reader device for an amusement facility according to another exemplary embodiment of the present invention.
Figure 6:
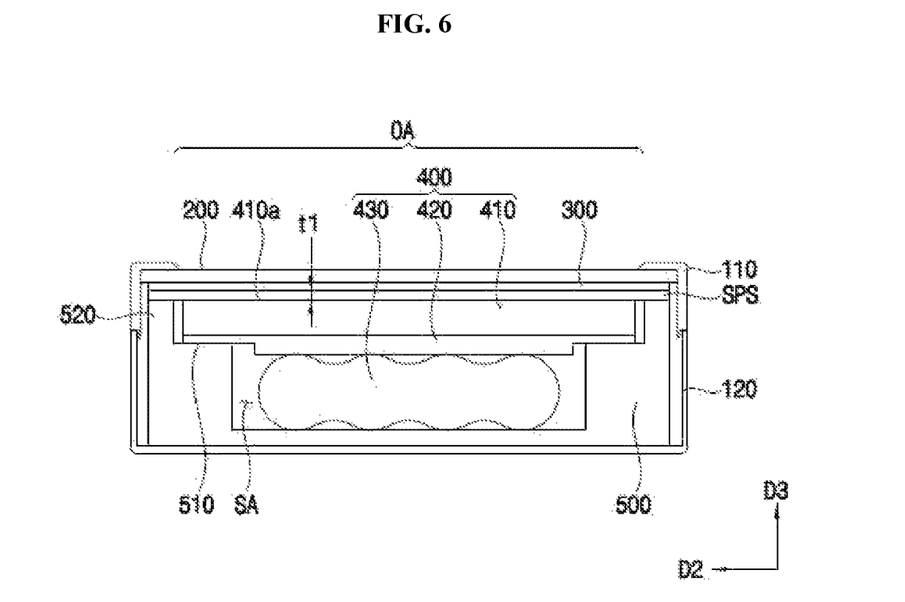
FIG. 6 is a side section view of the tag reader device of FIG. 5.

FIG. 5 is a perspective view of a tag reader device for an amusement facility according to another exemplary embodiment of the present invention. FIG. 6 is a side section view of the tag reader device of FIG. 5.

Referring to FIG. 5 to FIG. 6, the tag reader device is substantially the same as the tag reader device of FIG. 1 to FIG. 4 except space between the display module 400 and the antenna substrate 300 by using a spacer sheet SPS instead of a spacer (SP in FIG. 1). Therefore, repeated description is omitted.

The tag reader device may include a storage container 100, a protective plate 200, the antenna substrate 300, the spacer sheet SPS, the display module 400, and an internal support frame 500.

The space sheet SPS may be not affect an electromagnetic field formed by the RFID antenna of the antenna substrate 300, may be formed of a transparent material, and may transmit an image displayed on the display module 400. For example, the spacer sheet SPS may be a transparent plastic plate having a first thickness t1.

Through this, since the display module 400 and the antenna substrate 300 are spaced apart by a predetermined distance t1 by the spacer sheet SPS, it is possible to minimize the influence of the electromagnetic field formed by the RFID antenna by the display module 400.

In addition, since the display module 400, the spacer sheet SPS, the antenna substrate 300, and the protective plate 200 are sequentially stacked and have a structure in contact with each other, while forming a relatively solid stacked structure, the separation distance between the display module 400 and the antenna substrate 300 may be kept constant regardless of whether or not there is an external impact.

Figure 7:
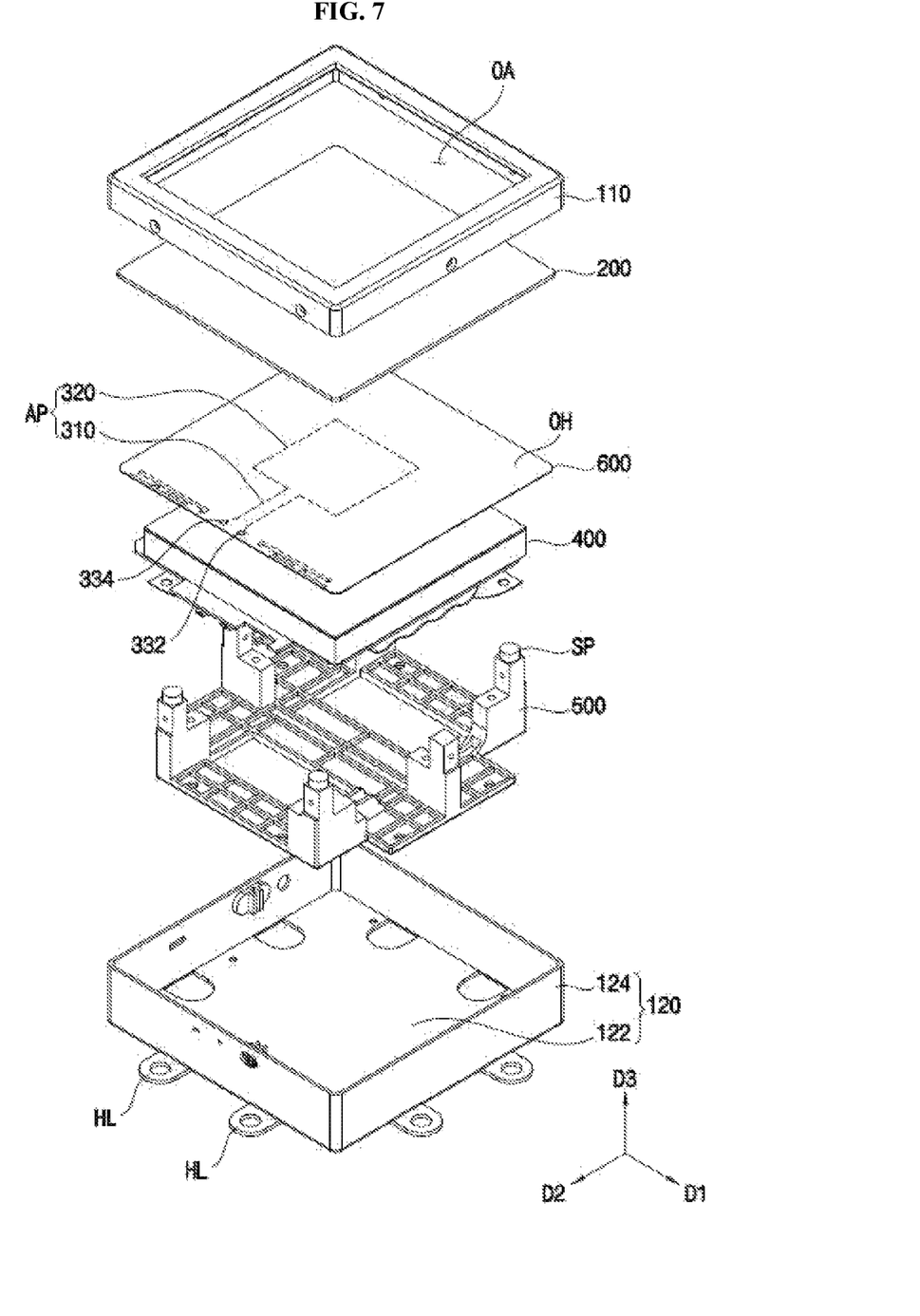
FIG. 7 is a perspective view of a tag reader device for an amusement facility according to another exemplary embodiment of the present invention.

FIG. 7 is a perspective view of a tag reader device for an amusement facility according to another exemplary embodiment of the present invention.

Referring to FIG. 7, the tag reader device is substantially the same as the tag reader device of FIG. 1 to FIG. 4 except that the antenna substrate 600 is transparent. Therefore, repeated description is omitted.

The tag reader device may include a storage container 100, a protective plate 200, the antenna substrate 600, the display module 400, and an internal support frame 500.

The antenna substrate 600 may be a transparent substrate. A RFID antenna AP may be formed on the antenna substrate 600. The RFID antenna AP may be formed on an upper surface or a lower surface of the antenna substrate 300. The RFID antenna AP may include connection terminals 332 and 334, a connection unit 310 connected to the connection terminals 332 and 334, and a loop-type unit 320 connected to the connection unit 310.

The antenna substrate 300 may be a PCB substrate on which the RFID antenna AP is printed, for a beautiful appearance, the antenna substrate 300 may be a transparent substrate, and the RFID antenna AP may be formed of a transparent conductive material. Accordingly, an image displayed through the display module 400 may be visually recognized by a user through the transparent antenna substrate 300 and the protective plate 200.

Figure 8:
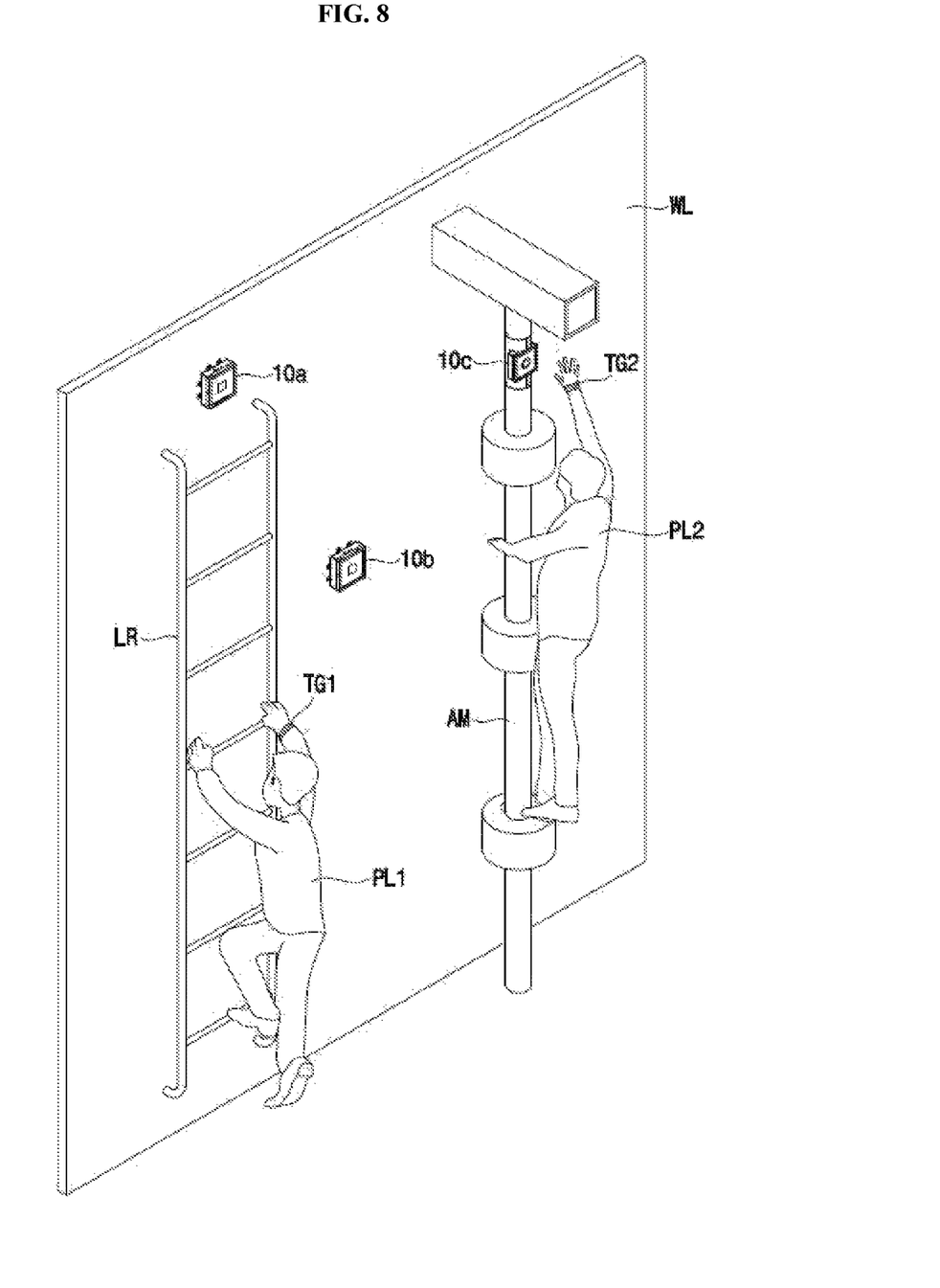
FIG. 8 is a view showing an example in which a tag reader device for an amusement facility according to an exemplary embodiment of the present invention.

FIG. 8 is a view showing an example in which a tag reader device for an amusement facility according to an exemplary embodiment of the present invention.

Referring to FIG. 8, tag reader devices for amusement facilities 10a, 10b and 10c may be installed in various places of amusement facilities, such as kids café. The tag reader devices 10a, 10b and 10c recognize the proximity of RFID tags part RFID; TG1 and TG2 processed by the users PL1 and PL2, that is, a tagging input, in response thereto, various marks or characters and the like may be displayed area (see DA of FIG. 1).

For example, when the first user PL1 tags the tag reader device 10a installed on the upper end of the ladder mechanism LR using the first RFID tag TG1, the first tag reader device 10a may display an indication indicating that the first user PL1 has successfully tagged on the display area or notify it through a speaker. On the other hand, as the second user PL2 tags the second RFID tag TG2 to the third tag reader device 10c installed in the pillar playground AM, the third tag reader device 10c may display an indication in the display area indicating that the second user PL2 has successfully tagged or may notify it through a speaker.

On the other hand, the tag reader device 10b may be installed on the wall WL, in this case, the tag reader device 10b may be installed on the wall WL using the coupling unit HL of the storage container of the tag reader device 10b (see HL in FIG. 1), through bolts, etc.

As shown, a plurality of tag reader devices may be installed in various places in the amusement facility, and whether tag reader devices are tagged for each of several users may be identified, data may be collected therefor through the communication unit (refer to the description of FIG. 1 to FIG. 4), so it is possible to build a system for various play and educational purposes. Through this, it stimulates interest in the user, and various methods such as grafting educational purposes may be applied through signs or combinations of characters displayed on the tag reader device.

Figure 9:
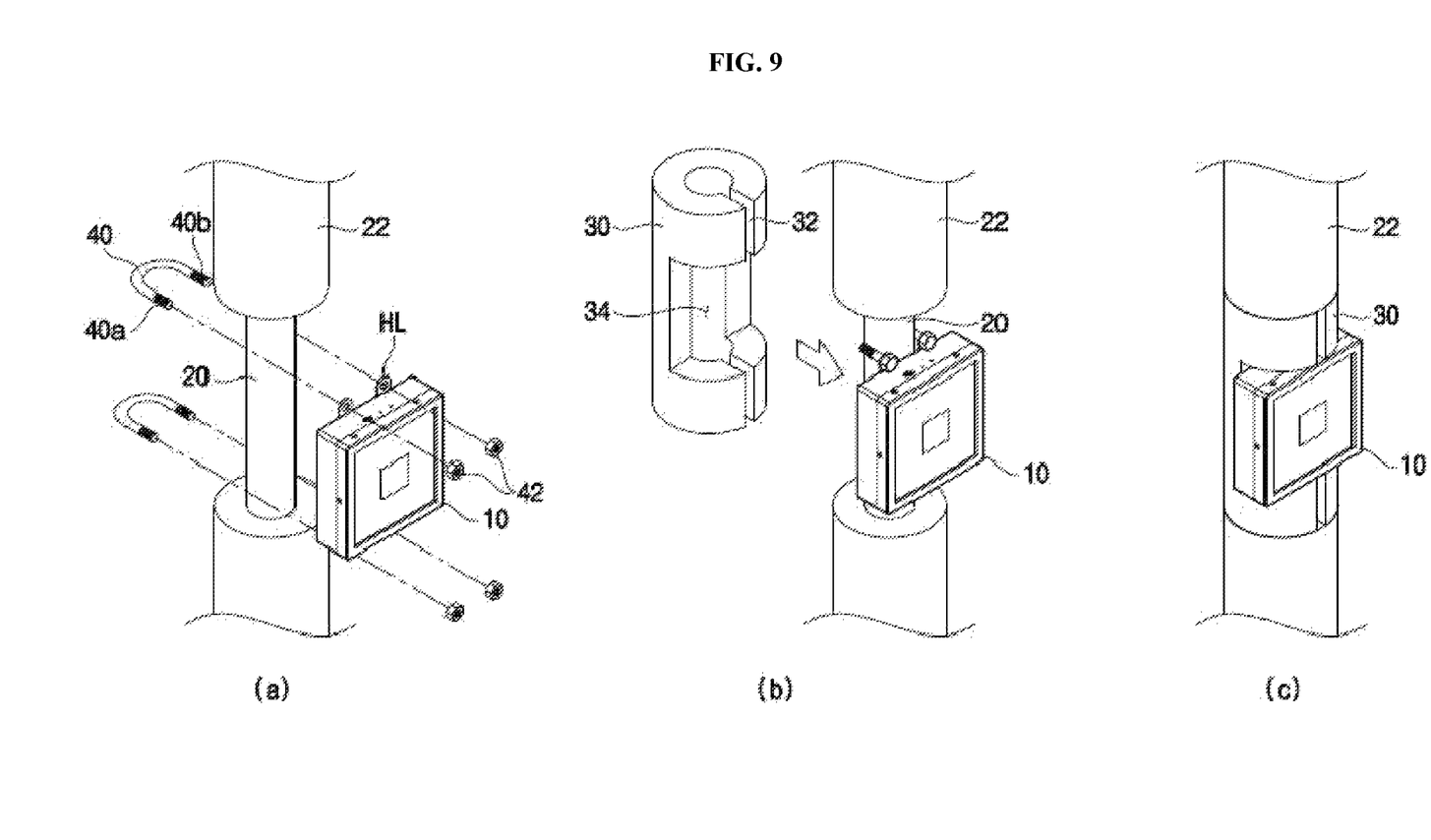
FIG. 9 shows views ((a) to (c)) for explaining how to install the tag reader device for an amusement facility according to an exemplary embodiment of the present invention in an amusement facility.

FIG. 9 shows views ((a) to (c)) for explaining how to install the tag reader device for an amusement facility according to an exemplary embodiment of the present invention in an amusement facility.

Referring (a) to (c) of FIG. 9, the cylindrical pipe 20 and a buffer unit 22 surrounding the pipe 20 and exposing a portion of the pipe 20 are installed. A tag reader device 10 is placed on the portion of the exposed pipe 20.

A first thread 40a and a second thread 40b are formed at both ends of the U-shaped coupling ring 40, the coupling ring 40 surrounds the portion of the pipe 20, after being coupled to the hole of the coupling unit HL of the tag reader device 10, the nut 42 is coupled to the first thread 40a and the second thread 40b, so that the tag reader device 10 may be fixed to the pipe 10.

Thereafter, the cut-out buffer unit 30 with the cut-out line 32 and the cut-out section 34 is coupled to surround the pipe 20 and the coupling ring 40 so as to expose the tag reader device, and while firmly fixing the tag reader device 10 to the pipe 20, the pipe 20 is covered by the buffer units 22 and 30, and it is possible to configure a safe play equipment.

According to embodiments of the present invention, a tag reader device for an amusement facility may be disposed on a display module for displaying an image and an antenna substrate and may include an antenna substrate on which a radio frequency identification (RFID) antenna is formed, a protective plate disposed on the antenna substrate, and a storage container for accommodating the display module and the antenna substrate.

The tag reader device generates tag input information by using a tag signal input through the RFID antenna, so that tags of a plurality of users may be recognized through one tag reader device.

In addition, the tag reader device has a structure in which a display module, an antenna substrate and a protective plate are sequentially stacked, so the structure may be implemented to be easy to maintain, be simple to manufacture, be resistant to external shocks, have improved RFID tag recognition, and display images on the front.

In addition, since a plurality of tag reader devices are installed in various places in the amusement facility, whether or not tagging is performed for each tag reader device of various users may be identified, and data about this may be collected through the communication unit, a system for various play and educational purposes may be built. Through this, it stimulates interest in the user, and various methods such as grafting educational purposes may be applied through signs or combinations of characters displayed on the tag reader device.

Although the present invention has been described with reference to the above exemplary embodiments, it will be understood by those skilled in the art that various modifications and changes may be made to the present invention without departing from the spirit and scope of the present invention as set forth in the claims below.

What is claimed is:

1. A tag reader device comprising:
a display module configured for displaying images;
an antenna substrate disposed on the display module with overlapping the display module, the antenna substrate having a radio frequency identification (RFID) antenna for recognizing proximity of a RFID tag;
a protective plate disposed on the antenna substrate; and
a storage container for accommodating the display module and the antenna substrate,
wherein the antenna substrate is disposed between the display module and the protective plate, and
wherein the antenna substrate is formed with a plurality of a openings arranged in a matrix so that the openings are formed to physically penetrate the substrate.

2. The tag reader device of claim 1, wherein the display module includes a plurality of light emitting diodes (LEDs) arranged in an array form, an image is displayed on the display module according to lighting of the LEDs, and the LEDs are disposed corresponding to the openings of the antenna substrate.

3. The tag reader device of claim 1, wherein the RFID antenna of the antenna substrate is a loop-type antenna, and is arranged not to overlap the openings.

4. The tag reader device of claim 1, further comprising:
an internal support frame including an antenna substrate support unit on which the antenna substrate is seated, and a mounting unit on which the display module is seated,
wherein the internal support frame is disposed in the storage container.

5. The tag reader device of claim 4, further comprising:
a battery disposed in the storage container to supply power to the display module.

6. The tag reader device of claim 4, further comprising:
a spacer to form a predetermined distance between the antenna substrate and the display module.

7. The tag reader device of claim 6, wherein the spacer is disposed between the antenna support unit and the antenna substrate and is formed of an elastic material.

8. The tag reader device of claim 6, wherein the spacer is a transparent plate disposed between the display module and the antenna substrate.

9. The tag reader device of claim 1, wherein the storage container comprises an upper storage container and a lower storage container, a front opening area exposing the protective plate is formed in the upper storage container, the image is displayed through the front opening area, and a coupling portion formed by bending a portion of a bottom surface of the lower storage container is formed in the lower storage container.

10. The tag reader device of claim 1, further comprising:
a circuit board to generate tag input information by using a tag signal input through the RFID antenna,
wherein the circuit board includes a communication unit for wirelessly transmitting the tag input information to an external device.

11. The tag reader device of claim 10, wherein the circuit board further comprises a controller configured to determine an image displayed on the display module according to the tag signal input through the RFID antenna.

* * * * *